Aug. 18, 1964     A. S. BOEHM ETAL     3,144,912
MASONRY DRILLING APPARATUS
Filed Nov. 21, 1960
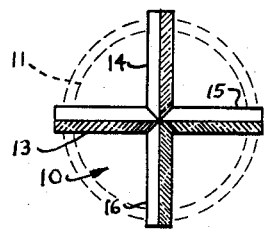
Fig. 1
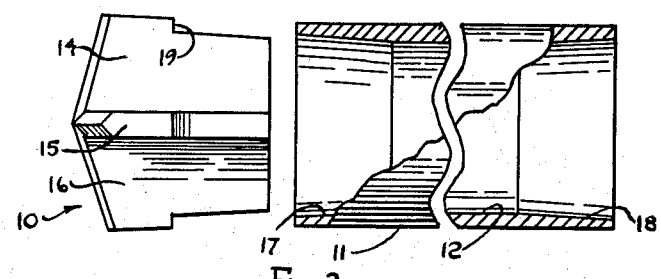
Fig. 2
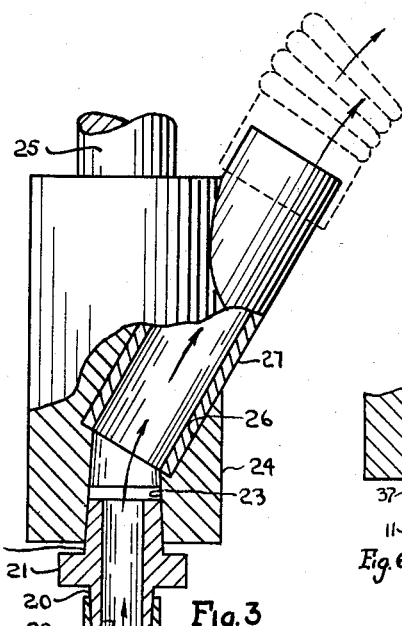
Fig. 3
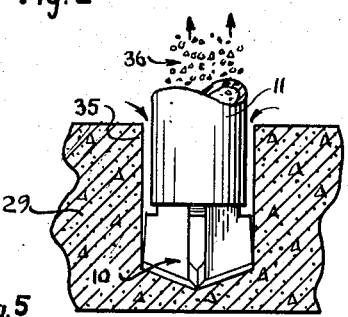
Fig. 5
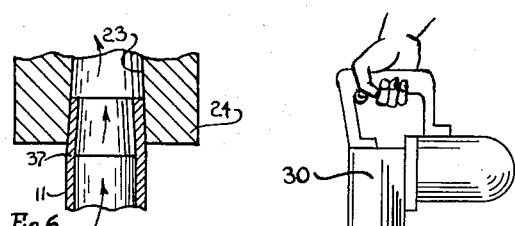
Fig. 6
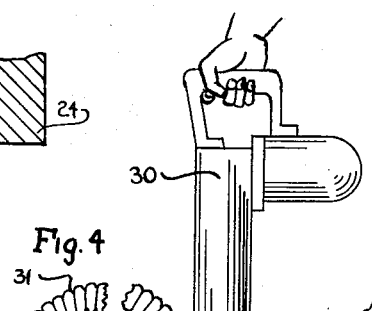
Fig. 4
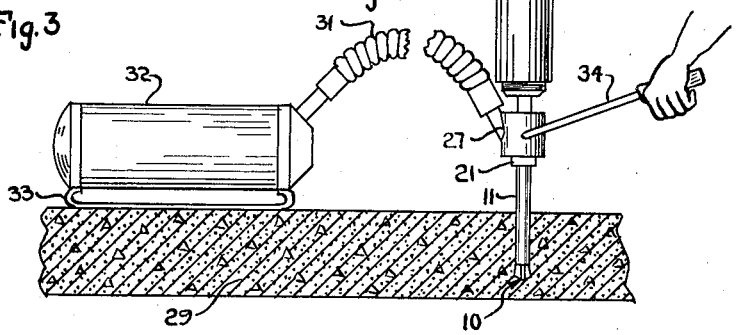
ARTHUR S. BOEHM
ROBERT H. RILEY, JR.
HAROLD O. SHORT
                  INVENTORS
BY *Leonard Bloom*
            ATTORNEY

United States Patent Office 3,144,912
Patented Aug. 18, 1964

3,144,912
MASONRY DRILLING APPARATUS
Arthur S. Boehm, Robert H. Riley, Jr., and Harold O. Short, Towson, Md., assignors to The Black and Decker Manufacturing Company, Towson, Md., a corporation of Maryland
Filed Nov. 21, 1960, Ser. No. 70,678
1 Claim. (Cl. 175—213)

The present invention relates to drilling apparatus, and more particularly, to masonry drilling apparatus suitable for use with concrete, granite, limestone, cinder-block, or similar building materials.

Apparatus for the drilling of masonry and similar types of building material generally devolves into two categories: one, the tool bit is actuated by a continuous rotation and is provided with a plurality of peripheral cutting teeth, such that the material is broken away by means of a cutting action, with the chips (or the entire core itself) passing internally of the tool bit; and two, the tool bit has a "star drill" configuration and a continuous impacting or hammering is imparted to it, the tool being occasionally oscillated by a hand-turning, with the result that a large quantity of material chips or dust particles are invariably generated due to the pulverizing action of the star drill. With regard to this latter category, and heretofore in the prior art, the star drill is made in a one-piece solid construction, that is to say, the shank and boring tip are integrally formed with no provision for the passage of dust particles therethrough. Despite the aforesaid hand-turning of the star drill, the dust particles are partially (and then only to a very slight degree) normally ejected from the work, with the egress of the dust particles being between the solid shank of the star drill and the walls of the hole being drilled; and consequently, the chips and dust particles are accumulated within the hole, thus clogging the drill and appreciably retarding the drilling rate. Moreover, this jamming of the star drill within the hole being drilled is especially pronounced for the longer shank lengths of star drills. Under such circumstances, it is often difficult to remove the star drill from the work, and usually the hole being drilled will become skewed.

Accordingly, it is an object of the present invention to alleviate these difficulties by providing masonry drilling apparatus including a star drill having a continuous longitudinal internal passageway for the egress of chips and dust particles therethrough.

It is another object of the present invention to provide masonry drilling apparatus actuated by a continuous hammering or impacting, wherein only the actual work-engaging portion of the apparatus is expended after sucessive drilling operations.

It is still another object of the present invention to provide masonry drilling apparatus using a replaceable bit having a "star drill" configuration.

It is yet another object of the present invention to provide masonry drilling apparatus having holding means, including a hollow cylindrical shank, for a replaceable drill bit.

It is a further object of the present invention to provide masonry drilling apparatus having the combination of a hollow cylindrical shank and a replaceable star drill bit, thus facilitating the concurrent usage of a continuous impacting imparted to the bit, together with a suction-actuated system for the removal of chips and dust particles.

It is a still further object of the present invention to provide masonry drilling apparatus including a star drill and having means to preclude the star drill from being skewed or jammed within the work.

It is a yet still further object of the present invention to provide masonry drilling apparatus that may be manufactured easily and economically, that appreciably diminishes the cost of labor and supplies, and that increases the overall drilling rate.

In accordance with the teachings of the present invention, a replaceable star drill bit is provided having a plurality of rearwardly-tapered flutes, such that the replaceable bit may be seated within one end of a hollow cylindrical shank. The shank is provided with a pair of internally-tapered female sockets, one at each end thereof, and means including a chuck is provided to couple the other end of the shank to a driving tool and to a source of vacuum. The outer edges of the flutes extend sufficiently beyond the outer cylindrical surfaces of the shank to facilitate a hand-turning or oscillation of the entire bit and shank as the bit pulverizes the work material, yet only slightly so as not to preclude the proper operation of the vacuum dust-collecting system, nor to interfere with the alignment of the hole being drilled. Moreover, each of the flutes is provided with a shoulder intermediate the ends thereof; such that when the replaceable star drill bit is seated within one end of the shank, there is sufficient clearance between the shoulder and the end of the shank to allow a wedge to be inserted therebetween for the purpose of ejecting the bit from the shank.

These and other objects of the present invention will become apparent from a reading of the following specification, taken in conjunction with the enclosed drawings, in which:

FIGURE 1 is an end view of a replaceable star drill bit, showing the hollow cylindrical shank in phantom view;

FIGURE 2 is a front elevational view of a replaceable star drill bit, showing in exploded relationship the hollow cylindrical shank within one end of which the bit is to be received;

FIGURE 3 is an assembled sectional view of the replaceable star drill bit, the hollow shank, and the means (including a chuck and adapter) to couple the other end of the shank to a driving tool and to a source of vacuum;

FIGURE 4 is a pictorial view of the drilling apparatus of the present invention in actual usage, showing a suitable power-operated impacting tool, and further showing a convenient source of suction for the removal of the chips and dust particles;

FIGURE 5 is a sectional view of the star drill in relation to the hole being drilled; and FIGURE 6 is a modification to a portion of the apparatus shown in FIGURE 3.

With reference to FIGURES 1 and 2, there is illustrated a replaceable drill bit 10 suitable for masonry drilling and adapted to be used in conjunction with a shank 11 that is provided with a continuous longitudinal internal passageway 12. The shank 11 may be any desired length whatsoever, depending upon the depth of hole that is to be drilled, and the shank 11 may be used again and again; only the replaceable drill bit 10, that is to say, the actual work-engaging portion of the masonry drilling apparatus, need be expended. The replaceable drill bit 10 (which, preferably, is specially heat-treated) is provided with a plurality of rearwardly-tapered flutes 13, 14, 15, and 16, two of which (13 and 15) are within a single plane (or planes), while the other two of which (14 and 16) are within another plane (or planes) intersecting the first plane at right angles thereto; thus a drill bit configuration is provided which is similar to that of a usual "star drill" having an integral shank and boring tip. Moreover, shank 11 may take the convenient form of a hollow cylinder (such as a length of tubing which is cyanide-hardened) having a pair of internally-tapered female sockets 17 and 18, one at each end thereof. Hence, the replaceable star drill bit 10 may be received within socket 17 of shank 11 and seated therein by means of a slight tapping action; and each of the flutes (say flute 14) is provided with a shoulder 19 intermediate the ends thereof, such that when the replaceable star drill bit 10 is seated within the shank 11, there will be sufficient clearance between the end of the shank and the shoulder 19. Thus as shown more particularly in FIGURE 3, after the masonry drilling or boring operation has been completed, there will be sufficient clearance to enable a wedge or similar device to be inserted between the shoulder 19 and the shank 11 for the purpose of ejecting the bit 10 from the shank 11.

With reference to FIGURE 3, there is illustrated the replaceable star drill bit 10 seated within socket 17 of shank 11, while the other socket 18 of shank 11 receives the tapered male end 20 of an adapter 21. The adapter 21 has another tapered male end 22 received within a corresponding internally-tapered socket 23 of a chuck 24, which preferably is constructed in accordance with the teachings of the co-pending McCarty et al. application S.N. 71,691; filed November 25, 1960, and assigned to the same assignee as the present invention. The opposite end 25 of the chuck 24 is suitably fashioned so as to be coupled to a conventional impacting tool; and moreover, the chuck 24 is provided with an interior inclined passageway 26 communicating with the socket 23. A tube 27 is inserted within the passageway 26, protrudes externally of the chuck 24, and is secured thereto by brazing or other suitable means. The adapter 21, like the shank 11, is provided with an internal continuous longitudinal passageway 28; hence, there will be a continuous communication between the respective flutes of the bit 10 through the shank 11 and adapter 21 and then via the socket 23 and inclined passageway 26 to the tube 27, thus providing continuous internal means for the suction-actuated egress of chips and dust particles therethrough.

With reference to FIGURE 4, there is illustrated a block of typical work material 29, which may be masonry or concrete, together with the drilling apparatus of the present invention in actual usage. The opposite end 25 of the chuck 24 is mechanically coupled to a suitable impacting tool, such as a conventional portable electric hammer 30; while the tube 27 of the chuck 24 is coupled by a hose 31 to a conventional heavy-duty vacuum cleaner 32, the latter having runners 33 for resting the cleaner 32 upon the work 29. There is also provided a conventional hand-turning chuck wrench 34 secured to the chuck 24 so that the operator may occasionally oscillate the chuck 24, and hence the star drill bit 10, in a manner well-known in the art.

The shank 11 shown in FIGURE 3 is interchangeable, that is to say, the sockets 17 and 18 at the ends thereof are identical to each other; but with reference to FIGURE 6, there is illustrated a shank 11 having an externally-tapered male end 37 (opposite from socket 17) so as to be received directly within the socket 23 of chuck 24, thus eliminating the need for adapter 21.

Thus, it will be appreciated that the difficulties of the prior art are alleviated by means of the present invention, wherein all of the chips and dust particles are immediately ejected from the hole being drilled by means of the continuous series of communicating internal passageways; hence, the masonry drilling operation is greatly accelerated. When multiplied by the tremendous number of separate drilling operations required in most large construction jobs, it will be understood that the overall savings in man-hours is quite important. Moreover, as shown more particularly in FIGURE 5, the flutes (13, 14, 15, or 16) of the replaceable star dill bit 10 extend only slightly (say 1/32" for an equivalent popular size of star drill) beyond the diameter of the hollow cylindrical shank 17. Consequently, as the hole 35 is being drilled, the shank 11, being approximately against the walls of the hole 35, tends to maintain the alignment of the hole 35, that is to say, keeps it straight rather than skewed; while at the same time, the diametral clearance between the shank 11 and the hole 35 is sufficient to allow the shank 11 and bit 10 to be rotated or oscillated slightly to prevent any bind between the hole 35 and the shank 11, and also, to facilitate the application of a powerful suction force as indicated by the small arrows. Moreover, as the shank (or tube) 11 is being oscillated or turned (along with the replaceable star drill bit 10), the chips and dust particles 36 passing within the hollow shank 11 are not turned, as is otherwise the case with regard to the integral (solid) star drills of the prior art; and thus, there is no opportunity herein for the star drill of the present invention to become clogged and jammed by reason of an accumulation of dust particles. Also, all of the components of the masonry drilling apparatus, that is to say, the bit 10, shank 11, adapter 21, and chuck 24, when in assembled relationship, have tapered interconnections throughout providing for a friction-type of continuous drive, together with means to allow for the passage of dust particles therethrough. In summary, then, it will be appreciated that the drilling apparatus of the present invention results in a material savings in labor and equipment, facilitates the rapid drilling of a multitude of holes ordinarily required in most large construction jobs, provides for the drilling of a clean and aligned hole, and greatly decreases the operator fatigue heretofore encountered.

Obviously, many modifications may be made without departing from the basic spirit of the present invention; and therefore, within the scope of the appended claim, the invention may be practiced other than has been specifically described.

We claim:

For use with a portable power-driven hammer for masonry drilling operations, wherein suction means are provided to draw the dust and grit particles out of the hole being drilled, a masonry drill comprising:

(a) a sleeve having a tapered socket at one end thereof, with the taper converging inwardly of the sleeve;

(b) means to couple the opposite end of said sleeve to the hammer and to the suction means; and (c) a replaceable star drill bit comprising four planar flutes spaced at right angles, one from another, and intersecting centrally of each other to form, in cross-section, a "star" configuration;

(d) each of said flutes having an outer side edge formed with a rearmost portion provided with a rearwardly-converging taper which is complementary to said tapered socket of said sleeve, whereby said star drill bit is seated within said sleeve;

(e) each of said flutes further having a forwardmost portion extending forwardly of said rearmost tapered portion, said forwardmost portion extending slightly in a radial direction beyond the outer diameter of said sleeve, whereby the hole being drilled is maintained straight while the bit is rotated, and whereby the suction draws outside air between the hole being drilled and the outer cylindrical wall of said sleeve, forces the air down into the hole, and draws the dust and grit particles out of the hole by passing upwardly between said flutes to within the inner cylindrical wall of said sleeve; and (f) a shoulder formed on each of said outer edges intermediate said rearmost tapered portion and said forwardmost portion, each of said shoulders being spaced in close proximity from the end of said sleeve, whereby said star drill bit may be quickly and conveniently removed from said sleeve, and whereby the outside air passes down into the hole to draw out the dust and grit particles.

References Cited in the file of this patent

UNITED STATES PATENTS

| | | |
|---|---|---|
| 1,006,661 | Knapp | Oct. 24, 1911 |
| 1,084,152 | Kessel | Jan. 13, 1914 |
| 1,106,966 | Pauli | Aug. 11, 1914 |
| 2,306,598 | Ellson | Dec. 29, 1942 |
| 2,356,921 | Edwards | Aug. 29, 1944 |
| 2,918,260 | Tilden | Dec. 22, 1959 |
| 2,969,846 | Sandvig | Jan. 31, 1961 |
| 3,032,129 | Fletcher et al. | May 1, 1962 |

FOREIGN PATENTS

| | | |
|---|---|---|
| 176,195 | Austria | Mar. 15, 1953 |
| 610,188 | Canada | Dec. 6, 1960 |